(12) United States Patent
Peng et al.

(10) Patent No.: US 10,666,155 B1
(45) Date of Patent: May 26, 2020

(54) SYNCHRONOUS RECTIFICATION DEVICE AND METHOD THEREOF

(71) Applicant: Chicony Power Technology Co., Ltd., New Taipei (TW)

(72) Inventors: Tso-Jen Peng, New Taipei (TW); Ssu-Hao Wang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/258,124

(22) Filed: Jan. 25, 2019

(30) Foreign Application Priority Data

Nov. 28, 2018 (TW) .............................. 107142566 A

(51) Int. Cl.
*H02M 3/335* (2006.01)
*H02M 1/08* (2006.01)
*H02M 1/38* (2007.01)

(52) U.S. Cl.
CPC ......... *H02M 3/33592* (2013.01); *H02M 1/08* (2013.01); *H02M 1/38* (2013.01); *H02M 3/33523* (2013.01); *H02M 3/33576* (2013.01)

(58) Field of Classification Search
CPC ...... H02M 3/33592; H02M 1/08; H02M 1/38; H02M 3/33523; H02M 3/33576
See application file for complete search history.

(56) References Cited

U.S. PATENT DOCUMENTS

| 9,755,529 B2 * | 9/2017 | Chen ................. H02M 3/33515 |
| 2005/0069326 A1 * | 3/2005 | Onde ................. H04B 10/2503 |
| | | 398/128 |
| 2005/0248964 A1 * | 11/2005 | Dalal ................. H02M 3/33592 |
| | | 363/21.08 |
| 2005/0271149 A1 | 12/2005 | Dupuis |
| 2006/0013022 A1 * | 1/2006 | Jitaru ...................... H02M 1/38 |
| | | 363/21.12 |
| 2006/0133116 A1 | 6/2006 | Schaible et al. |
| 2011/0222318 A1 | 9/2011 | Uno et al. |

(Continued)

FOREIGN PATENT DOCUMENTS

| CN | 102904449 A | 1/2013 |
| EP | 3410133 A1 | 12/2018 |

(Continued)

*Primary Examiner* — Kyle J Moody

(74) *Attorney, Agent, or Firm* — Innovation Capital Law Group, LLP; Vic Lin

(57) ABSTRACT

A synchronous rectification device is adapted to control a conversion circuit, where he conversion circuit includes: a primary side coil, configured to receive input power; and a secondary side coil, configured to generate inductive power in response to the input power. The synchronous rectification device includes: a first control circuit, configured to provide a first control signal to control the primary side coil; a secondary side switch, configured to generate an ON signal and an OFF signal according to the inductive power; an isolation coupling element; and a second control circuit. The isolation coupling element includes: a receiving side, configured to receive the first control signal; and a reaction side, configured to generate a coupling signal in response to the first control signal. The second control circuit outputs a second control signal according to the coupling signal, the ON signal, and the OFF signal to adjust the inductive power.

10 Claims, 6 Drawing Sheets

(56) References Cited

U.S. PATENT DOCUMENTS

| | | |
|---|---|---|
| 2012/0235649 A1 | 9/2012 | Uno |
| 2015/0249398 A1* | 9/2015 | Halberstadt ....... H02M 3/33592 363/21.14 |
| 2016/0111961 A1* | 4/2016 | Balakrishnan .... H02M 3/33507 363/21.12 |
| 2017/0117813 A1 | 4/2017 | Lee |
| 2017/0214322 A1 | 7/2017 | Lin et al. |
| 2018/0131279 A1 | 5/2018 | Sun et al. |
| 2018/0183342 A1* | 6/2018 | Strijker ............. H02M 3/33592 |
| 2018/0248488 A1* | 8/2018 | Cao ................... H02M 3/33592 |
| 2019/0149032 A1* | 5/2019 | Yang .................... H02M 1/083 |

FOREIGN PATENT DOCUMENTS

| | | |
|---|---|---|
| TW | 201642569 A | 12/2016 |
| TW | 201643583 A | 12/2016 |
| TW | I569562 B | 2/2017 |
| TW | 201729528 A | 8/2017 |

\* cited by examiner

SYNCHRONOUS RECTIFICATION DEVICE AND METHOD THEREOF

CROSS-REFERENCE TO RELATED APPLICATION

This non-provisional application claims priority under 35 U.S.C. § 119(a) to Patent Application No. 107142566 filed in Taiwan, R.O.C. on Nov. 28, 2018, the entire contents of which are hereby incorporated by reference.

BACKGROUND

Technical Field

The present disclosure relates to the field of power conversion, and in particular, to a synchronous rectification device and a method thereof.

Related Art

With the progress and development of technologies, electronic products become increasingly diverse, and different electronic products need to operate at different voltages or different currents. As a result, many different power supplies have been developed to meet needs, and to facilitate the increasingly flourishing of the power conversion technology. Therefore, the power conversion technology belongs to a relatively important part in the electronics industry.

Currently, in the power supplies, to achieve a high efficiency and low loss rectification function, a synchronous rectification device has become an important and indispensable core part. The same as other types of rectification devices do, the synchronous rectification device includes a primary side switch and a secondary side switch. However, in the conventional synchronous rectification device, due to a parasitic element or a signal surge in a circuit, the primary side switch and the secondary side switch may be turned on simultaneously, which causes a short circuit in the synchronous rectification device. When a short circuit occurs in the synchronous rectification device, additional power loss and unnecessary electromagnetic interference may occur, and elements in the synchronous rectification device may be damaged. Consequently, the synchronous rectification device cannot operate properly.

SUMMARY

In view of this, the present disclosure provides a synchronous rectification device, adapted to control a conversion circuit. The conversion circuit includes a primary side coil and a secondary side coil, the primary side coil is configured to receive input power, and the secondary side coil is configured to generate inductive power in response to the input power. The synchronous rectification device includes a first control circuit, a secondary side switch, an isolation coupling element, and a second control circuit. The first control circuit is configured to provide a first control signal. The secondary side switch is configured to generate an ON signal and an OFF signal according to the inductive power. The isolation coupling element includes a receiving side and a reaction side. The receiving side is configured to receive the first control signal. The reaction side is configured to generate a coupling signal in response to the first control signal. The second control circuit is configured to output a second control signal according to the coupling signal, the ON signal, and the OFF signal to adjust the inductive power.

According to some embodiments, the secondary side switch is configured to be turned on or off according to the second control signal to adjust the inductive power.

According to some embodiments, the synchronous rectification device further includes a primary side switch. The primary side switch is configured to be turned on or off according to the first control signal. When the primary side switch is on, the secondary side switch is off According to some embodiments, the second control circuit adjusts the second control signal according to the OFF signal to turn off the secondary side switch.

According to some embodiments, the second control circuit includes a level generating circuit. The level generating circuit is configured to provide a judgment level for the second control circuit to adjust the second control signal.

According to some embodiments, the level generating circuit adjusts the judgment level to a first level in response to the coupling signal.

According to some embodiments, the level generating circuit adjusts the judgment level to a second level in response to the ON signal.

According to some embodiments, when the judgment level is the first level, the second control circuit adjusts the second control signal according to the ON signal to turn on the secondary side switch.

According to some embodiments, the synchronous rectification device further includes a counting circuit. The counting circuit is configured to adjust the judgment level according to a counting time.

According to some embodiments, when a duration during which the judgment level is the first level exceeds the counting time, the counting circuit adjusts the judgment level to the second level.

According to some embodiments, a synchronous rectification device method includes: converting input power into inductive power according to a first control signal; generating an ON signal and an OFF signal according to the inductive power; generating a coupling signal in response to the first control signal; outputting a second control signal according to the coupling signal, the ON signal, and the OFF signal; and adjusting the inductive power according to the second control signal.

According to some embodiments, the synchronous rectification device method further includes adjusting the second control signal according to a judgment level, where the judgment level is adjusted to a first level in response to the coupling signal, and the judgment level is adjusted to a second level in response to the ON signal.

According to some embodiments, the synchronous rectification device method further includes adjusting the judgment level according to a counting time, where when a duration during which the judgment level is the first level exceeds the counting time, the judgment level is adjusted to the second level.

In conclusion, according to the synchronous rectification device and the method thereof of the present disclosure, the second control signal is output according to the coupling signal, the ON signal, and the OFF signal to adjust the inductive power. The synchronous rectification device can prevent a short circuit case caused when the primary side switch and the secondary side switch are turned on simultaneously. In some embodiments, the synchronous rectification device and the method thereof further include adjusting the judgment level according to the counting time. Therefore, the synchronous rectification device has a reset function.

DETAILED DESCRIPTION

In the present disclosure, the word "coupling" and derivatives thereof may be used. In some embodiments, "coupling" may be used to represent that two or more elements are either in direct physical or electrical contact, or may mean that two or more elements are not in direct contact with each other but yet still co-operate or interact with each other.

Figure 1:
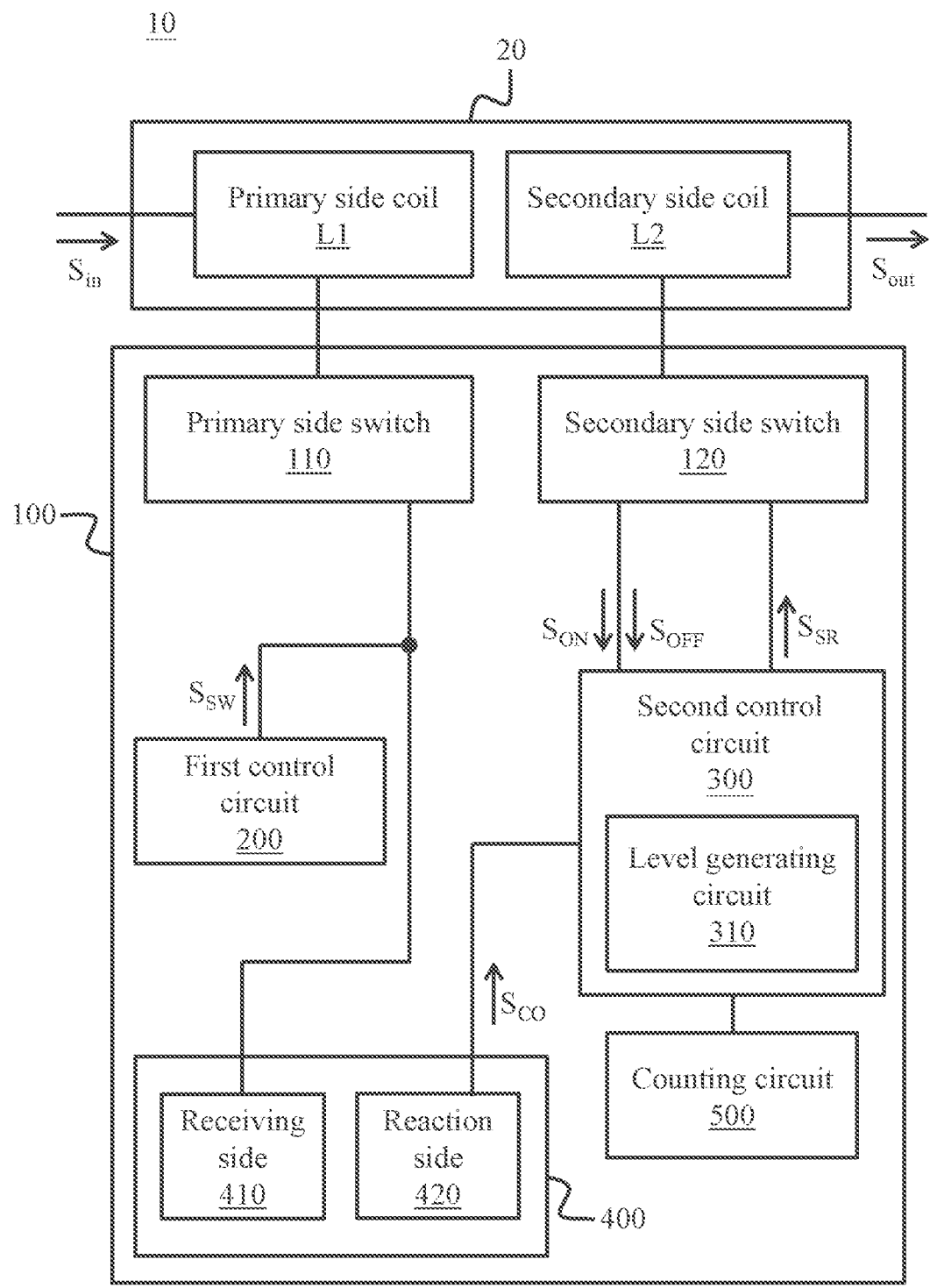
FIG. 1 is a block diagram of a synchronous rectification device according to some embodiments of the present disclosure.

FIG. 1 is a block diagram of a synchronous rectification device 100 according to some embodiments of the present disclosure. In some embodiments, a power supplier 10 includes a conversion circuit 20 and a synchronous rectification device 100. The conversion circuit 20 is configured to receive input power $S_{in}$ and generate inductive power $S_{out}$ in response to the input power $S_{in}$, and the synchronous rectification device 100 is adapted to control the conversion circuit 20.

Still refer to FIG. 1, the synchronous rectification device 100 includes a secondary side switch 120, a first control circuit 200, a second control circuit 300, and an isolation coupling element 400. The first control circuit 200 and the second control circuit 300 are separately coupled to the conversion circuit 20, and the isolation coupling element 400 is coupled between the first control circuit 200 and the second control circuit 300. The first control circuit 200 and the second control circuit 300 are configured to control the conversion circuit 20, so that the conversion circuit 20 can convert the input power $S_{in}$ into the inductive power $S_{out}$. The first control circuit 200 provides a first control signal $S_{SW}$ to control the conversion circuit 20, and the conversion circuit 20 receives the input power $S_{in}$ according to the first control signal $S_{SW}$. The second control circuit 300 outputs a second control signal $S_{SR}$ to control the conversion circuit 20, and the conversion circuit 20 generates the inductive power $S_{out}$ according to the second control signal $S_{SR}$. In addition, the secondary side switch 120 generates an ON signal $S_{ON}$ and an OFF signal $S_{OFF}$ in response to the inductive power $S_{out}$. The isolation coupling element 400 is configured to generate a coupling signal $S_{CO}$ in response to the first control signal $S_{SW}$. Specifically, the second control signal $S_{SR}$ output by the second control circuit 300 adjusts the inductive power $S_{out}$ by using the secondary side switch 120. The second control circuit 300 outputs the second control signal $S_{SR}$ according to the coupling signal $S_{CO}$, the ON signal $S_{ON}$, and the OFF signal $S_{OFF}$.

Based on the above, operations between the first control circuit 200 and the second control circuit 300 should be specifically noted. The first control circuit 200 controls the second control circuit 300 by using the isolation coupling element 400 and the conversion circuit 20.

In some embodiments, the power supplier 10 operates in, for example but not limited to, a situation in which an alternating current (AC) is converted to a direct current (DC). The power supplier 10 further includes a rectification circuit (not shown). The rectification circuit is configured to convert an externally input AC power (not shown) into a DC input power $S_{in}$ for the conversion circuit 20 to receive. The input power $S_{in}$ and the inductive power $S_{out}$ processed by the conversion circuit 20 are DC power.

Still refer to FIG. 1, in some embodiments, the conversion circuit 20 includes a primary side coil L1 and a secondary side coil L2. The primary side coil L1 is configured to receive input power $S_{in}$, and the secondary side coil L2 is configured to generate inductive power $S_{out}$ in response to the input power $S_{in}$. Energy conversion between the primary side coil L1 and the secondary side coil L2 is implemented by electromagnetic induction. Specifically, when the primary side coil L1 receives the input power $S_{in}$ according to the first control signal $S_{SW}$, the inductive power $S_{out}$ generated by the secondary side coil L2 in response to the input power $S_{in}$ gradually decreases. On the contrary, when the primary side coil L1 does not receive the input power $S_{in}$ according to the first control signal $S_{SW}$, the inductive power $S_{out}$ generated by the secondary side coil L2 in response to the input power $S_{in}$ gradually increases.

Figure 2:
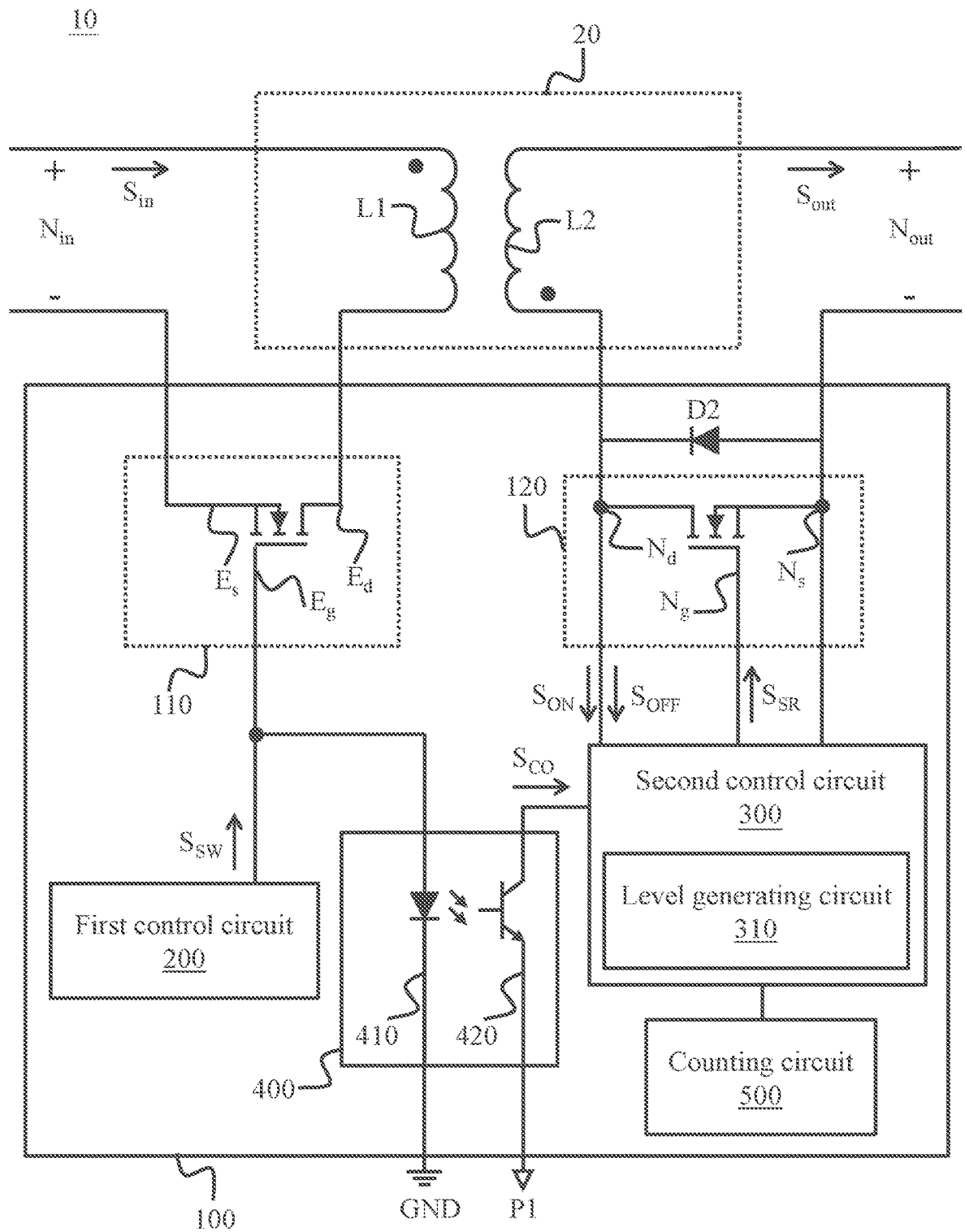
FIG. 2 is a circuit diagram of a synchronous rectification device according to some embodiments of the present disclosure.

FIG. 2 is a circuit diagram of a synchronous rectification device 100 according to some embodiments of the present disclosure. In some embodiments, a power supplier 10 includes two input ends $N_{in}$. The two input ends $N_{in}$ are configured to receive input power $S_{in}$, and a primary side coil L1 is configured to transfer energy to a secondary side coil L2 according to the input power $S_{in}$.

Still refer to FIG. 2, in some embodiments, the synchronous rectification device 100 further includes a primary side switch 110. The primary side switch 110 has a control electrode $E_g$, a first electrode $E_d$, and a second electrode $E_s$. The control electrode $E_g$ of the primary side switch 110 is coupled to a first control circuit 200. The primary side coil L1 is coupled between one end of the two input ends $N_{in}$ and the first electrode $E_d$. The other end of the two input ends $N_{in}$ is coupled to the second electrode $E_s$. The primary side switch 110 is turned on or off according to a first control signal $S_{SW}$. Specifically, the control electrode $E_g$ turns on or off the first electrode $E_d$ and the second electrode $E_s$ of the primary side switch 110 according to a change of the first control signal $S_{SW}$. Moreover, when the first electrode $E_d$ and the second electrode $E_s$ of the primary side switch 110 are on, the primary side coil L1 receives the input power $S_{in}$. When the first electrode $E_d$ and the second electrode $E_s$ of the primary side switch 110 are off, the primary side coil L1 does not receive the input power $S_{in}$. In other words, the first control signal $S_{SW}$ output by the first control circuit 200 controls the primary side coil L1 by using the primary side switch 110.

Figure 3:
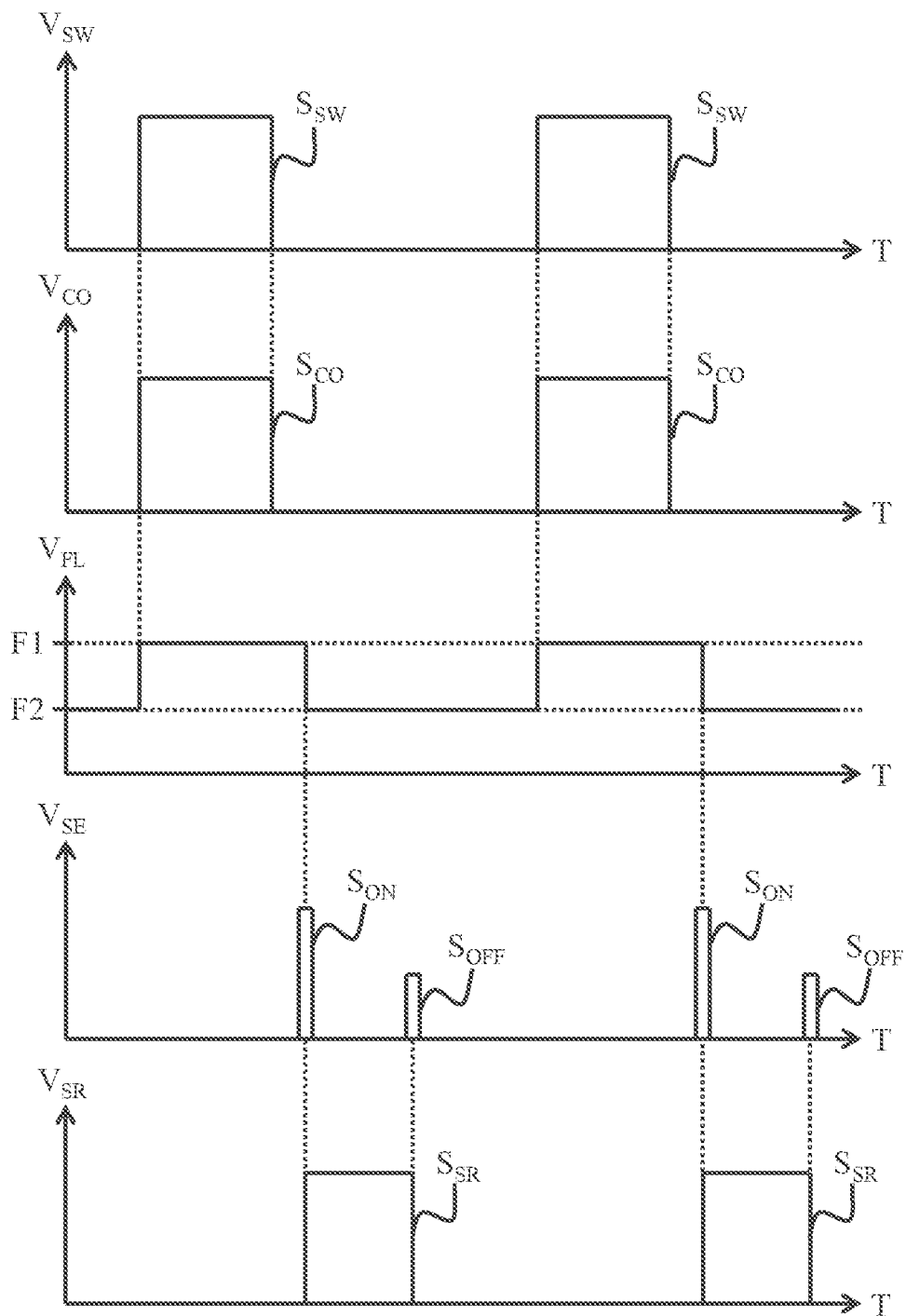
FIG. 3 is a signal diagram of a synchronous rectification device according to some embodiments of the present disclosure.

FIG. 3 is a signal diagram of a synchronous rectification device 100 according to some embodiments of the present disclosure. A horizontal axis of the signal diagram is time T, and a vertical axis of the signal diagram is a first control voltage $V_{SW}$, a coupling voltage $V_{CO}$, a judgment level $V_{FL}$, an inducting voltage $V_{SE}$, and a second control voltage $V_{SR}$. In some embodiments, the first control circuit 200 is a pulse width modulation (PWM) controller, and the first control signal $S_{SW}$ is a periodic square wave. The first control signal $S_{SW}$ for each cycle is composed of a high level and a low level, and a duration of each cycle is fixed. The first control circuit 200 controls ratios of the high level and the low level respectively in the duration of each cycle. According to some embodiments, when the first control signal $S_{SW}$ is at a high level, the primary side switch 100 is on.

Still refer to FIG. 2, in some embodiments, the power supplier 10 includes two output ends $N_{out}$. The two output ends $N_{out}$ are configured to output the inductive power $S_{out}$, and the secondary side coil L2 is configured to receive the energy transferred by the primary side coil L1 to generate the input power $S_{out}$.

Still refer to FIG. 2, in some embodiments, the synchronous rectification device 100 further includes a secondary side diode D2. The secondary side switch 120 has a control end $N_g$, a first end $N_d$, and a second end $N_s$. The secondary side diode D2 is coupled between the first end $N_d$ and the second end $N_s$ of the secondary side switch 120. The control end $N_g$, the first end $N_d$, and the second end $N_s$ of the secondary side switch 120 are separately coupled to the second control circuit 300. The secondary side coil L2 is coupled between one end of the two output ends $N_{out}$ and the first end $N_d$. The other end of the two output ends $N_{out}$ is coupled to the second end $N_s$. The secondary side switch 120 is turned on or off according to the second control signal $S_{SR}$. Specifically, the control end $N_g$ turns on or off the first end $N_d$ and the second end $N_s$ of the secondary side switch 120 according to a change of the second control signal $S_{SR}$. The secondary side diode D2 is configured to enable the inductive power $S_{out}$ to flow between the first end $N_d$ and the second end $N_s$ when the secondary side switch 120 is turned off. According to some embodiments, the secondary side diode D2 is a parasitic element of the secondary side switch 120.

In some embodiments, the first control circuit 200 controls the second control circuit 300 by using the isolation coupling element 400 and the conversion circuit 20, and therefore, a time for which the second control signal $S_{SR}$ enables the secondary side switch 120 to be on does not overlap a time for which the first control signal $S_{SW}$ enables the primary side switch 110 to be on. In other words, when the primary side switch 110 is on, the secondary side switch 120 is off. Therefore, the synchronous rectification device 100 can prevent a short circuit case caused when the primary side switch 110 and the secondary side switch 120 are turned on simultaneously.

Figure 4:
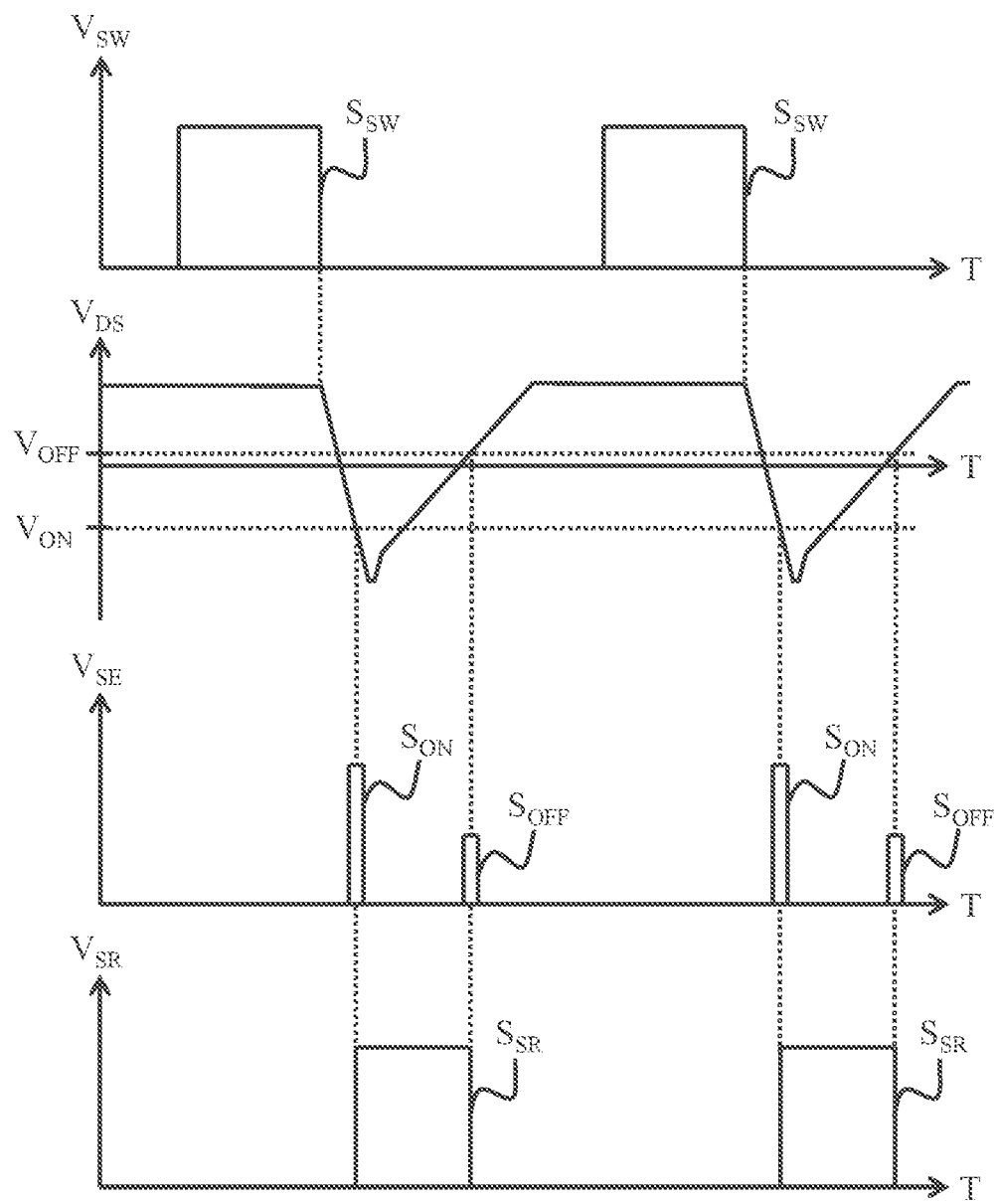
FIG. 4 is a signal diagram of an inducting voltage according to some embodiments of the present disclosure.

Referring to FIG. 2 and FIG. 4 together, FIG. 4 is a signal diagram of an inducting voltage $V_{SE}$ according to some embodiments of the present disclosure. A horizontal axis of the signal diagram is time T, and a vertical axis of the signal diagram is a first control voltage $V_{SW}$, an operating voltage $V_{DS}$, an inducting voltage $V_{SE}$, and a second control voltage $V_{SR}$. In some embodiments, the secondary side switch 120 has the operating voltage $V_{DS}$. The operating voltage $V_{DS}$ is a potential difference between the first end $N_d$ and the second end $N_s$, and varies under an impact of the inductive power $S_{out}$. Specifically, when the inductive power $S_{out}$ passes through the secondary side switch 120 or the secondary side diode D2, charge accumulated between the first end $N_d$ and the second end $N_s$ of the secondary side switch 120 increases or decreases along a direction of current of the inductive power $S_{out}$, and therefore, a magnitude of the operating voltage $V_{DS}$ varies with the inductive power $S_{out}$. When the operating voltage $V_{DS}$ meets one of a plurality of inducting voltages $V_{SE}$ (an ON voltage $V_{ON}$ and an OFF voltage $V_{OFF}$ are both inducting voltages $V_{SE}$), the secondary side switch 120 generates a corresponding ON signal $S_{ON}$ or OFF signal $S_{OFF}$. When the operating voltage $V_{DS}$ meets the corresponding ON voltage $V_{ON}$, the secondary side switch 120 generates the corresponding ON signal $S_{ON}$. When the operating voltage $V_{DS}$ meets the corresponding OFF voltage $V_{OFF}$, the secondary side switch 120 generates the corresponding OFF signal $S_{OFF}$. It should be particularly noted that the signal diagram of the inducting voltage $V_{SE}$ versus time T is merely used to illustrate a time sequence of the ON signal $S_{ON}$ and the OFF signal $S_{OFF}$.

Based on the above, in some embodiments, the secondary side switch is configured to be turned on or off according to the second control signal $S_{SR}$ to adjust the inductive power $S_{out}$. When the secondary side switch 120 is on, since the operating voltage $V_{DS}$ can be regarded as zero, the inductive power $S_{out}$ is not limited by the secondary side switch 120, and the conversion circuit 20 can normally output the inductive power $S_{out}$. When the primary side switch 110 is turned off, the inductive power $S_{out}$ is limited by the secondary side diode D2, and therefore, the conversion circuit 20 cannot normally output the inductive power $S_{out}$.

Still refer to FIG. 2 and FIG. 3, in some embodiments, the isolation coupling element 400 includes a receiving side 410 and a reaction side 420. The receiving side 410 is coupled between the first control circuit 200 a grounding end GND, and the reaction side 420 is coupled between the second control circuit 300 and a reference potential end P1. The receiving side 410 is configured to receive the first control signal $S_{SW}$. The reaction side 420 is configured to generate a coupling signal $S_{CO}$ in response the first control signal $S_{SW}$. Specifically, the isolation coupling element 400 is configured to transfer the first control signal $S_{SW}$ output by the first control circuit 200 to the second control circuit 300 in the form of the coupling signal $S_{CO}$. When the first control signal $S_{SW}$ flowing through the receiving side 410 meets a preset threshold of the isolation coupling element 400, the reaction side 420 generates the coupling signal $S_{CO}$ corresponding to the first control signal $S_{SW}$, and the reaction side 420 outputs the coupling signal $S_{CO}$ to the second control circuit 300. According to some embodiments, when the first control signal $S_{SW}$ is at a high level, the reaction side 420 generates the coupling signal $S_{CO}$, where a duration of the coupling signal $S_{CO}$ corresponds to a duration during which the first control signal $S_{SW}$ is at a high level.

Based on the above, in some embodiments, the isolation coupling element 400 is configured to isolate the first control circuit 200 from the second control circuit 300, and to isolate the primary side switch 110 from the secondary side switch 120. Therefore, the isolation coupling element 400 prevents mutual interference between the primary side switch 110 and the secondary side switch 120 due to an abnormal surge. According to some embodiments, the isolation coupling element 400 is an optical coupler.

Still refer to FIG. 2 and FIG. 3, in some embodiments, the second control circuit 300 outputs the second control signal $S_{SR}$ according to the coupling signal $S_{CO}$, the ON signal $S_{ON}$, and the OFF signal $S_{OFF}$. The coupling signal $S_{CO}$ and the ON signal $S_{ON}$ are configured to drive the second control circuit 300 to start to output the second control signal $S_{SR}$. The OFF signal $S_{OFF}$ is configured to drive the second control circuit 300 to stop outputting the second control signal $S_{SR}$. In other words, when the second control circuit 300 receives the OFF signal $S_{OFF}$, the second control circuit 300 stops outputting the second control signal $S_{SR}$, and the secondary side switch 120 is thus off.

Based on the above, in some embodiments, the second control circuit 300 further includes a level generating circuit 310. The level generating circuit 310 is configured to provide a judgment level $V_{FL}$ used to adjust the second control signal $S_{SR}$ for the second control circuit 300. The level generating circuit 310 adjusts the judgment level $V_{FL}$ to a first level F1 in response to the coupling signal $S_{CO}$. The level generating circuit 310 adjusts the judgment level $V_{FL}$ to a second level F2 in response to the ON signal $S_{ON}$.

According to some embodiments, when the judgment level $V_{FL}$ is the first level F1, the second control circuit 300 adjusts the second control signal $S_{SR}$ according to the ON signal $S_{ON}$ to turn on the secondary side switch 120. In other words, when the second control circuit 300 needs to receive the ON signal $S_{ON}$ and detect that the judgment level $V_{FL}$ is the first level F1, the second control circuit 300 starts to output the second control signal $S_{SR}$, and the secondary side switch 120 is on according to the second control signal $S_{SR}$. The second control circuit 300 needs to verify the coupling signal $S_{CO}$ transferred by the first control circuit 200 by using the isolation coupling element 400 and the ON signal $S_{ON}$ transferred by the conversion circuit 20. Therefore, the synchronous rectification device 100 can prevent a short circuit case caused when the primary side switch 110 and the secondary side switch 120 are turned on simultaneously.

It should be specifically noted that, in some embodiments, when the level generating circuit 310 receives the coupling signal $S_{CO}$, the level generating circuit 310 switches the judgment level $V_{FL}$ from the second level F2 to the first level F1. After the level generating circuit 310 receives the ON signal $S_{ON}$ and the second control circuit 300 starts to output the second control signal $S_{SR}$ to turn on the secondary side switch 120, the level generating circuit 310 switches the judgment level $V_{FL}$ from the first level F1 to the second level F2.

Figure 5:
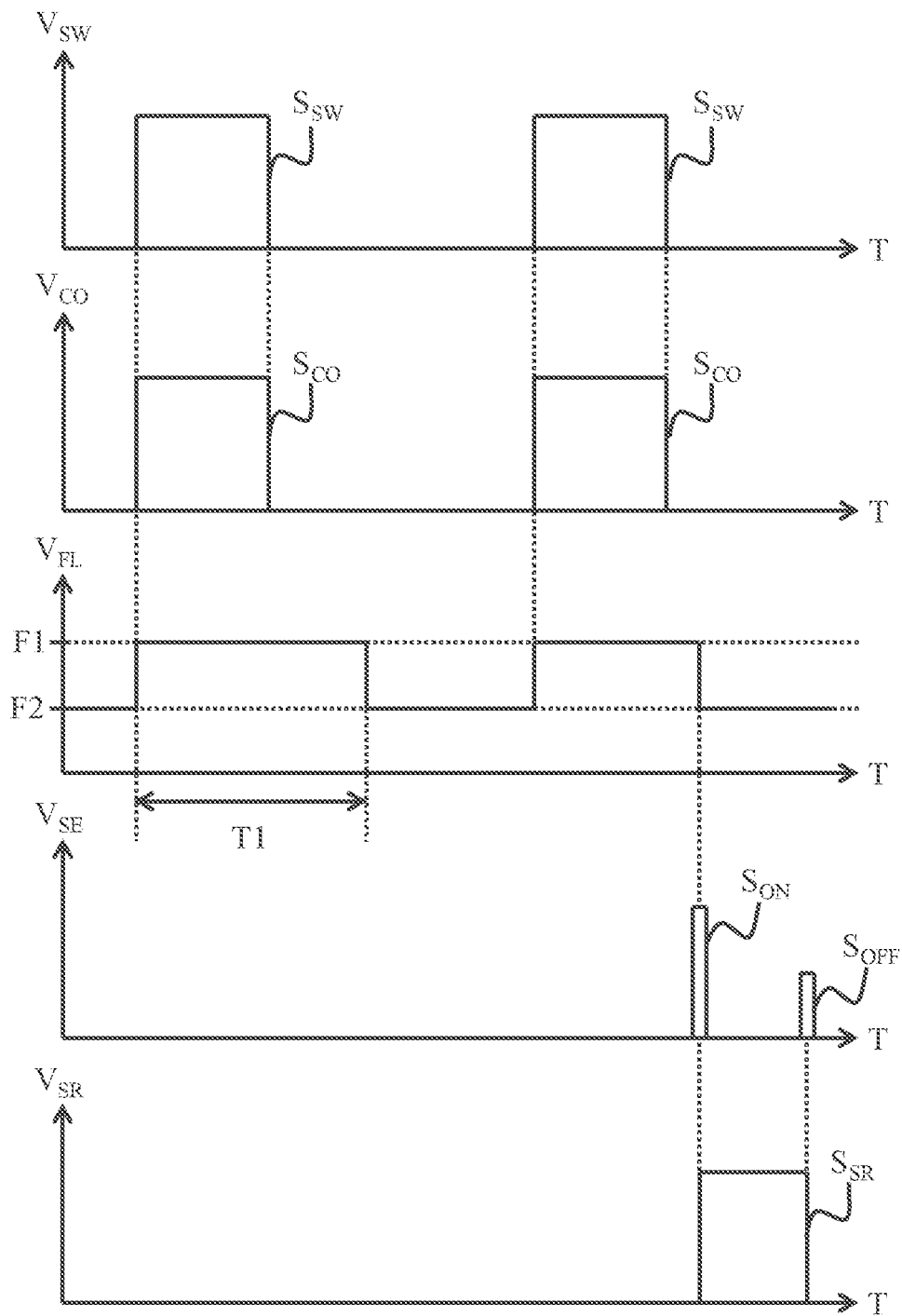
FIG. 5 is a signal diagram of a counting time according to some embodiments of the present disclosure.

FIG. 5 is a signal diagram of a counting time T1 according to some embodiments of the present disclosure. The synchronous rectification device 100 further includes a counting circuit 500 coupled to the level generating circuit 310. The counting circuit 500 is configured to adjust the judgment level $V_{FL}$ according to a counting time T1. When a duration during which the judgment level $V_{FL}$ is the first level F1 exceeds the counting time T1, the counting circuit 500 adjusts the judgment level $V_{FL}$ to the second level F2. Specifically, when the judgment level $V_{FL}$ is always the first level F1, the secondary side switch 120 is easily to be incorrectly turned on due to an incorrect ON signal $S_{ON}$. Therefore, the counting circuit 500 adjusts the judgment level $V_{FL}$ from the first level F1 to the second level F2 to achieve a reset function of the synchronous rectification device 100.

Figure 6:
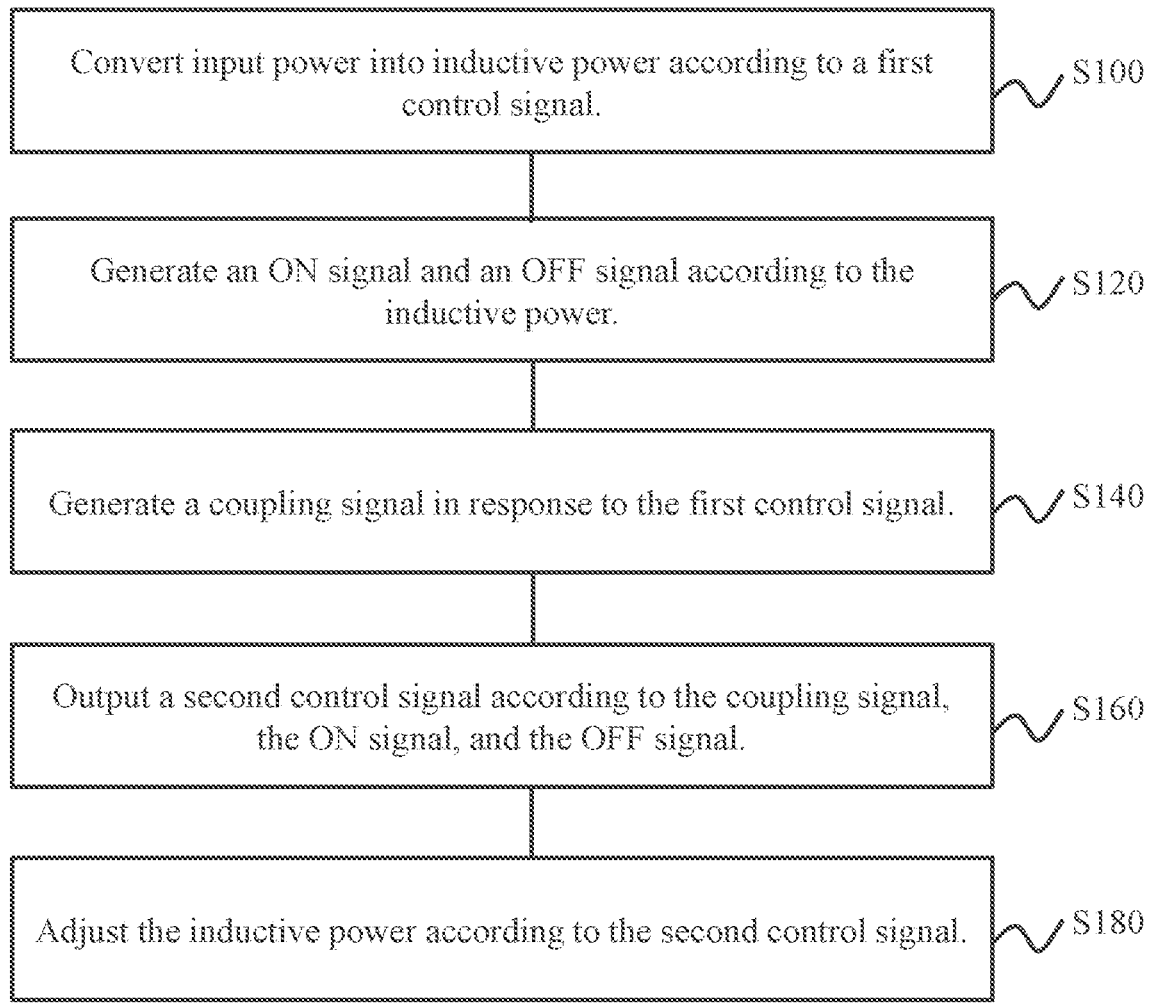
FIG. 6 is a flowchart of a synchronous rectification method according to some embodiments of the present disclosure.

FIG. 6 is a flowchart of a synchronous rectification method according to some embodiments of the present disclosure. In some embodiments, the synchronous rectification method includes the following steps:

Step S100: Convert input power $S_{in}$ into inductive power $S_{out}$ according to a first control signal $S_{SW}$.

Step S120: Generate an ON signal $S_{ON}$ and an OFF signal $S_{OFF}$ according to the inductive power $S_{out}$.

Step S140: Generate a coupling signal $S_{CO}$ in response to the first control signal $S_{SW}$.

Step S160: Output a second control signal $S_{SR}$ according to the coupling signal $S_{CO}$, the ON signal $S_{ON}$, and the OFF signal $S_{OFF}$.

Step S180: Adjust the inductive power $S_{out}$ according to the second control signal $S_{SR}$.

According to some embodiments, the synchronous rectification method further includes: adjusting the second control signal $S_{SR}$ according to a judgment level $V_{FL}$, where the judgment level $V_{FL}$ is adjusted to a first level F1 in response to the coupling signal $S_{CO}$ and the judgment level $V_{FL}$ is adjusted to a second level F2 in response to the ON signal $S_{ON}$.

According to some embodiments, the synchronous rectification method further includes: adjusting the judgment level $V_{FL}$ according to a counting time T1, where when a duration during which the judgment level $V_{FL}$ is the first level F1 exceeds the counting time T1, the judgment level $V_{FL}$ is adjusted to the second level F2.

In conclusion, according to the synchronous rectification device 100 and the method thereof of the present disclosure, the second control signal $S_{SR}$ is output according to the coupling signal $S_{CO}$, the ON signal $S_{ON}$, and the OFF signal $S_{OFF}$ to adjust the inductive power $S_{out}$. The synchronous rectification device 100 can prevent a short circuit case caused when the primary side switch 100 and the secondary side switch 120 are turned on simultaneously. In some embodiments, the synchronous rectification device 100 and the method thereof further include adjusting the judgment level $V_{FL}$ according to the counting time T1. Therefore, the synchronous rectification device 100 has a reset function.

What is claimed is:

1. A synchronous rectification device, adapted to control a conversion circuit, wherein the conversion circuit comprises a primary side coil and a secondary side coil, the primary side coil is configured to receive an input power, and the secondary side coil is configured to generate an inductive power in response to the input power, and the synchronous rectification device comprises:
    a first control circuit, configured to provide a first control signal to control the primary side coil;
    a primary side switch, configured to be turned on or off according to the first control signal;
    a secondary side switch, configured to generate an ON signal and an OFF signal according to the inductive power, wherein when the primary side switch is on, the secondary side switch is off;
    an optical isolation coupling element, comprising:
        a receiving side, configured to receive the first control signal; and
        a reaction side, configured to generate a coupling signal in response to the first control signal; and
    a second control circuit, configured to output a second control signal according to the coupling signal, the ON signal, and the OFF signal to adjust the inductive power, wherein the second control circuit adjusts the second control signal according to the OFF signal to turn off the secondary side switch, and the secondary side switch is configured to be turned on or off according to the second control signal to adjust the inductive power, wherein within one of a plurality of ON/OFF cycles of the secondary side switch, the second control circuit adjusts the second control signal according to the OFF signal to turn off the secondary side switch.

2. The synchronous rectification device according to claim 1, wherein the second control circuit comprises: a level generating circuit, configured to provide a judgment level for the second control circuit to adjust the second control signal.

3. The synchronous rectification device according to claim 2, wherein the level generating circuit adjusts the judgment level to a first level in response to the coupling signal.

4. The synchronous rectification device according to claim 3, wherein the level generating circuit adjusts the judgment level to a second level in response to the ON signal.

5. The synchronous rectification device according to claim 4, wherein when the judgment level is the first level, the second control circuit adjusts the second control signal according to the ON signal to turn on the secondary side switch.

6. The synchronous rectification device according to claim 4, further comprising: a counting circuit, configured to adjust the judgment level according to a counting time.

7. The synchronous rectification device according to claim 6, wherein when a duration during which the judgment level is the first level exceeds the counting time, the counting circuit adjusts the judgment level to the second level.

8. A synchronous rectification method, comprising:
receiving an input power by using a primary side coil;
generating an inductive power in response to the input power by using a secondary side coil;
generating a first control signal to control the primary side coil by using a first control circuit;
turning on or off a primary side switch according to the first control signal;
generating an ON signal and an OFF signal according to the inductive power by using a secondary side switch, wherein when the primary side switch is on, the secondary side switch is off;
generating a coupling signal in response to the first control signal by using an optical isolation coupling element;
outputting a second control signal according to the coupling signal, the ON signal, and the OFF signal by using a second control circuit; and
adjusting the inductive power according to the second control signal;
wherein the second control circuit adjusts the second control signal according to the OFF signal to turn off the secondary side switch, and the secondary side switch is configured to be turned on or off according to the second control signal to adjust the inductive power;
wherein within one of a plurality of ON/OFF cycles of the secondary side switch, the second control circuit adjusts the second control signal according to the OFF signal to turn off the secondary side switch.

9. The synchronous rectification method according to claim 8, further comprising:
adjusting the second control signal according to a judgment level, wherein the judgment level is adjusted to a first level in response to the coupling signal, and the judgment level is adjusted to a second level in response to the ON signal.

10. The synchronous rectification method according to claim 9, further comprising:
adjusting the judgment level according to a counting time, wherein when a duration during which the judgment level is the first level exceeds the counting time, the judgment level is adjusted to the second level.

* * * * *